United States Patent [19]

Hiramatsu et al.

[11] Patent Number: 5,311,350
[45] Date of Patent: May 10, 1994

[54] OPTICAL DEVICE AND APPARATUS USING THE OPTICAL DEVICE

[75] Inventors: Mitsuo Hiramatsu; Isuke Hirano; Tatsuo Fujinami, all of Hamamatsu, Japan

[73] Assignee: Hamamatsu Photonics K.K., Shizuoka, Japan

[21] Appl. No.: 822,017

[22] Filed: Jan. 16, 1992

[30] Foreign Application Priority Data

Jan. 16, 1991 [JP] Japan .................................. 3-003387
Jun. 21, 1991 [JP] Japan .................................. 3-150445

[51] Int. Cl.⁵ .......................... G02F 1/03; G02F 1/153; G02F 1/00
[52] U.S. Cl. .................................. 359/263; 359/265; 359/270; 359/318; 359/321
[58] Field of Search ............... 359/247, 252, 253, 254, 359/261, 263, 265, 270, 271, 321, 318

[56] References Cited

U.S. PATENT DOCUMENTS

| | | | |
|---|---|---|---|
| 3,614,200 | 10/1971 | Taylor ..................... | 359/250 |
| 4,013,343 | 3/1977 | Jaccard et al. ............ | 359/271 |
| 4,146,876 | 3/1979 | Arellano et al. .......... | 359/265 |
| 4,174,152 | 11/1979 | Giglia et al. .............. | 359/270 |
| 4,571,029 | 2/1986 | Skotheim et al. ......... | 359/266 |
| 4,640,748 | 2/1987 | Wudl et al. ............... | 358/59 |
| 4,772,940 | 9/1988 | Wudl et al. ............... | 358/59 |
| 4,773,740 | 9/1988 | Kawakami et al. ........ | 359/270 |
| 4,786,128 | 11/1988 | Birnbach .................. | 385/8 |
| 4,867,541 | 9/1989 | Hotomi ..................... | 359/265 |
| 5,044,713 | 9/1991 | Mozer et al. .............. | 359/252 |

FOREIGN PATENT DOCUMENTS

| | | |
|---|---|---|
| 0021967 | 7/1981 | European Pat. Off. . |
| 0139312 | 12/1979 | Fed. Rep. of Germany ...... 359/252 |
| 235864 | 4/1985 | Fed. Rep. of Germany . |

OTHER PUBLICATIONS

W. Primak et al. "Electromigration in Ion Bombardment", J. Electrochem Soc., 124(II), 1816-8 (1977).
D. E. Carlson et al., "Ion Depletion of Glass at a Blocking Anode: II, Properties of Ion-Depleted Glasses" J. Amer. Cerom Soc., 57(7) 295-300 (1974).
Chiba et al., "Measurement of Ion Mobility in a Glass Substrate for Planar Microlens Formation", A Journal of Electronic Communication Soc., 85/7 vol. J68-C No. 7.
Fujinami et al., "Anion-Conducting Film/Composed of Poly(vinyl chloride), Quarternary Ammonium Iodide, and Organotin Compound", Chemistry Letters pp. 127-128, 1990.
Saito, "Electrical Properties in Solid Polymers", pp. 3-(Rec. Nov. 8, 1974).
Yoshino et al., "Proposal of Electro-Optical Switching and Memory Devices Utilizing Doping and Undoping Processes of Conducting Polymers," Japanese Journal of Applied Physics, vol. 22, No. 3, Mar. 1983, pp. L157-L158.

*Primary Examiner*—Bruce Y. Arnold
*Assistant Examiner*—Evelyn A. Lester
*Attorney, Agent, or Firm*—Cushman, Darby & Cushman

[57] ABSTRACT

The present invention provides an optical device according to this invention comprising a light transmitting optical member of a high molecular material containing mobile ions, and a pair of electrodes formed on surfaces of the optical member, a required potential difference being provided between the electrodes so as to cause ion conduction in the optical member and to reversibly vary a refractive index of the optical member. According to this invention, a refractive index is reversibly varied due to ion conduction, whereby the modulation of a transmitted beam or a reflected beam by the optical device can be reversibly controlled.

10 Claims, 17 Drawing Sheets

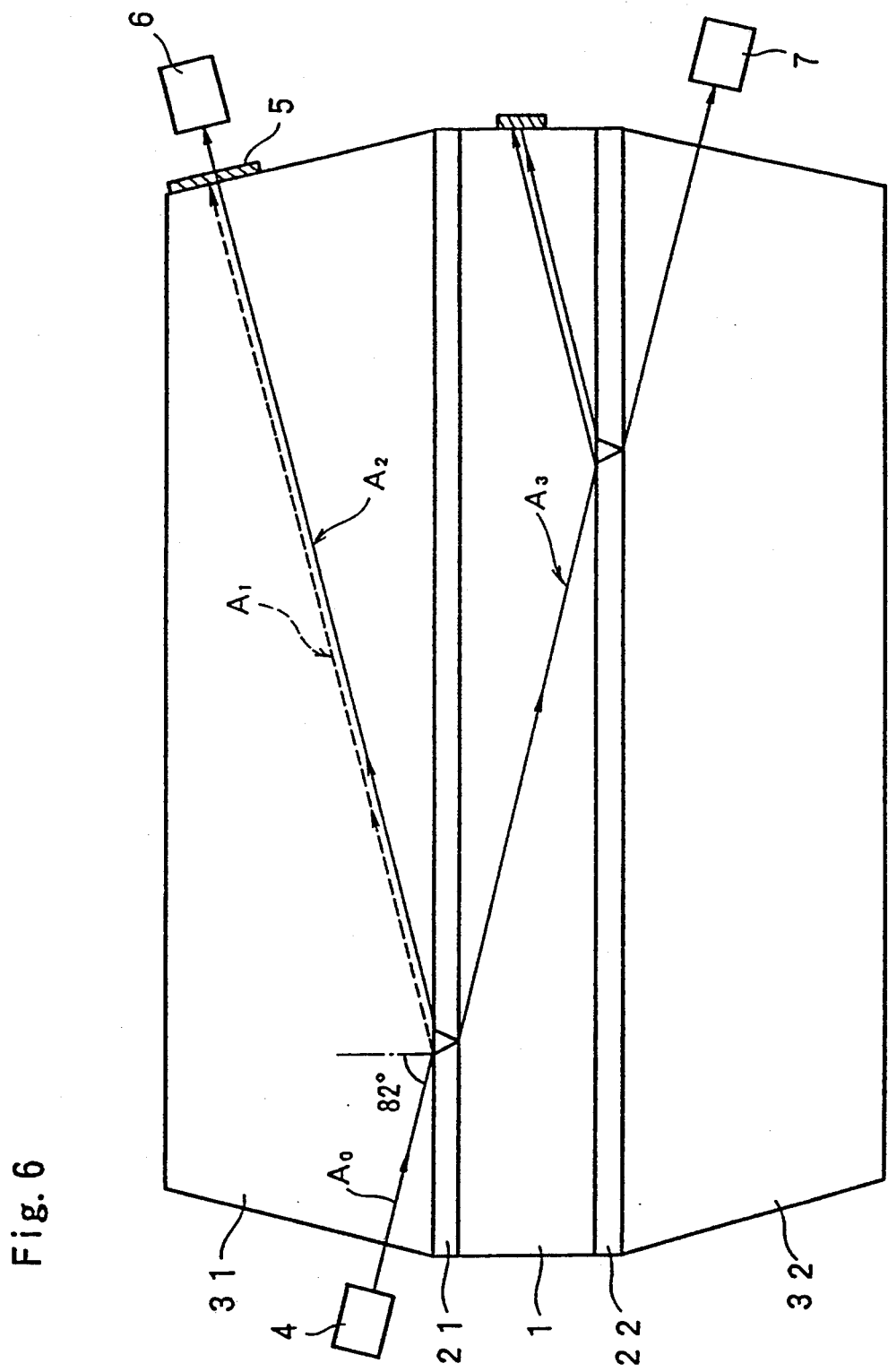

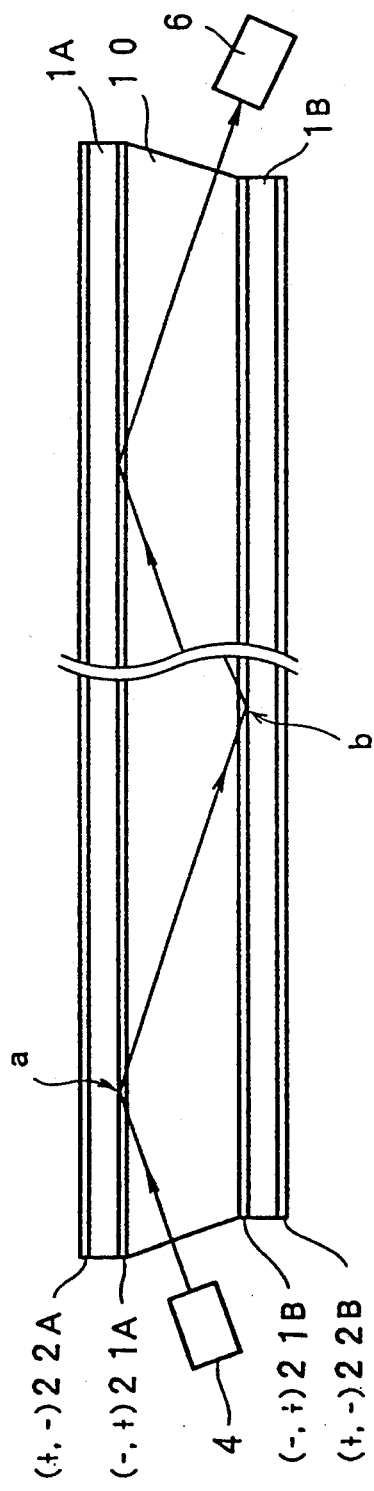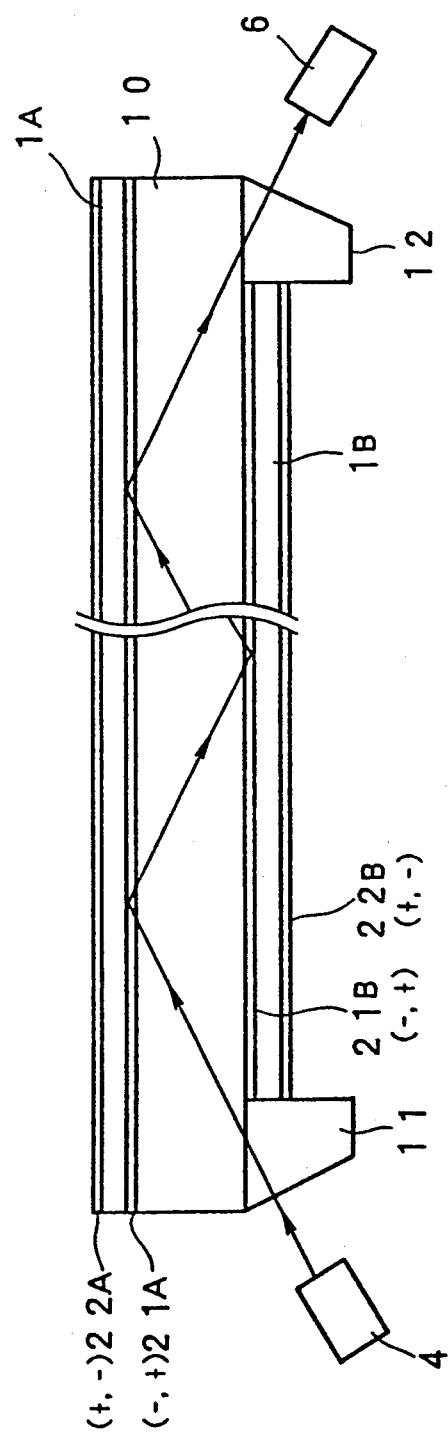

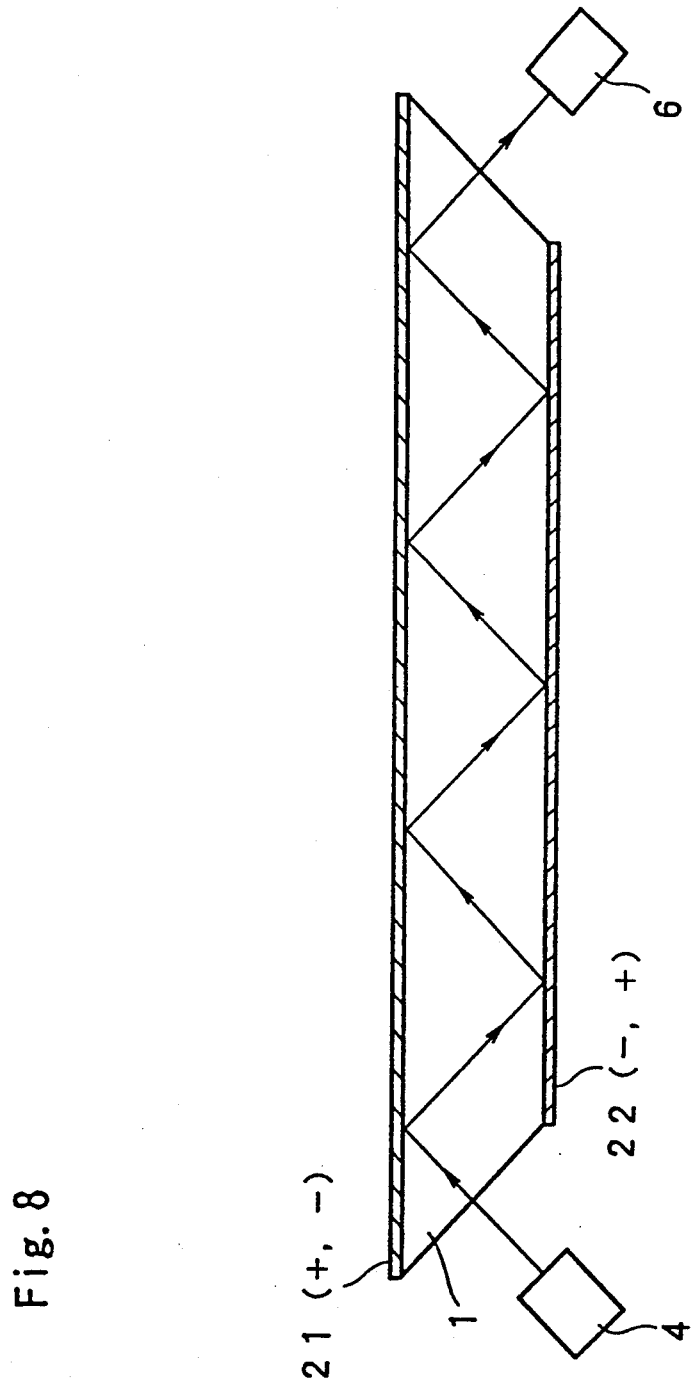

INCIDENT LIGHT

OPTICAL DEVICE AND APPARATUS USING THE OPTICAL DEVICE

BACKGROUND OF THE INVENTION

1. Field of the Invention

This invention relates to an optical device and an apparatus using the optical device, the refractive index of which is varied by application of an external electric field.

2. Related Background Art

As prior art of the method for varying a refractive index by application of an external electric field, there is a method using nonlinear optical effect (see W. Primak et al., J. Electrochem Soc., 124(II), 1816-8(1977)). In other prior art of the method, ions are removed from glass by placing it at high temperatures and under high pressure so as to make refractive indexes of glasses as a property low by causing ion depletion in the glass (see D. E. Carlson et al., J. Amer. Ceram Soc., 57(7), 295–300 (1974) and D. E. Carlson et al., Am. Ceram Soc. Bull., 52(9), 705(1973)), dopants are added to glass substrates by using a method of electrically induced migration (see Chiba et al. a Journal of Electronic Communication Society, 85/7 vol. J68-C No. 7), and optical glasses having gradients of the refractive indexes are fabricated by ion exchange (see A. Feltz et al., DD0235864, WPI Acc No: 86-245898/38)).

But the method using nonlinear optical effect has the problems that high voltages KVs have to be applied to the optical device, which result in high-intensity electric fields occurring in the glass, and further, the high refractive index variations can not be obtained. On the other hand, it is possible to vary the refractive index as one property by the method of doping or depleting ions. But this refractive index variation is irreversible, and the refractive index cannot be reversibly controlled.

SUMMARY OF THE INVENTION

An object of this invention is to provide an optical device, the refractive index of which can be reversibly controlled, and which can be operated at low voltages.

The applicants discovered that the refractive index of the material containing mobil ions, that is, an ion conductor, reversibly varies according to the electrical field applied thereto, and they thought that the discovered characteristics of the material can be utilized in various optical devices, and completed the present invention. That is, there has been no reference showing the discovered characteristics of the material containing mobil ions and the utilization of the characteristics before the present invention.

Further in the application, the terminology "ion conductor" means the material containing mobile ions which reversibly move according to the electrical field applied thereto, for example, such as the material shown in papers titled as "Ionic Conductivities Induced by Quaternary Ammonium Iodide and Organic Compounds" of CHEMISTRY LETTERS PP 127-128, 1990 OF THE CHEMICAL SOCIETY OF JAPAN, which was described by Dr. Tatsuo Fujinami, one of the applicants.

It is further an object of the present invention to provide an optical device comprising: an ion conductor made of a transparent material containing mobile ions, of which its refractive index reversibly varies according to electric field applied thereto; and at least one pair of electrodes facing each other through the ion conductor and contacting the ion conductor; wherein when the electric field is applied to the ion conductor through the electrodes, the refractive index in at least one area of the ion conductor is changed according to the applied electric field.

It is further an object of the present invention to provide an optical switch comprising; a transparent substrate having a first refractive index; ion conductor films made of a transparent material containing mobile ions and provided on the both sides of said transparent substrate, said ion conductor film having a second refractive index lower than said first refractive index; a pair of electrodes provided on the both sides of each of said ion conductor films, one of said pair electrodes contacting with said transparent substrate; and potential applying means for applying electrical potential to the electrodes respectively, to reversibly change the refractive index of the ion conductor film to cause the full reflection in an interface between the ion conductor film and the transparent substrate to perform the change of the optical path.

It is further an object of the present invention to provide an optical device comprising: ion conductor made of a transparent material containing mobile ions, of which its refractive index reversibly varies according to electrical field applied thereto; a container accommodating said ion conductor; at least one portion of said container being made of a transparent material; and a pair of electrodes located on inside surfaces of said container and facing each other, said electrodes contacting said ion conductor.

It is further an object of the present invention to provide a device for detecting a concentration of liquid, comprising: an optical device including; ion conductor made of a transparent material including a mobile ion, of which its refractive index reversibly varies according to electric field applied thereto; and a pair of electrodes facing each through said ion conductor and directly contacting said ion conductor; a light source for projecting a light beam having a predetermined wave length from a predetermined direction on one side of said optical device; light detecting means for receiving a light beam reflected from said optical device; applying means for applying electric potential to said electrodes; and control means for controlling said applying means so as to keep an output from said light detecting means constant thereby to determine the concentration of material contacting the other side of said optical device on the basis of the electrical potential applied to said electrodes.

It is further an object of the present invention to provide an optical device for changing a wavelength of an incident light to reflect it, comprising: (a) an optical device including: ion conductor made of a transparent material including a mobile ion, of which its refractive index reversibly varies according to electric field applied thereto; a pair of electrodes facing each then through said ion conductor and directly contacting said ion conductor; and a member having a refractive index larger than that of the ion conductor; and (b) applying means for applying electrical potential to the electrodes thereby to reversibly change the refractive index of the ion conductor to perform the change of the wavelength of the incident light to reflect it.

It is further an object of the present invention to providing an optical memory device comprising: ion conductor made of a transparent material containing mobile ions, of which its refractive index reversibly varies according to electric field applied thereto; and a first electrode member having a plurality of strips in parallel arranged along a first direction and provided on one side of the ion conductor in contact with the ion conductor; and a second electrode member having a plurality of strips in parallel arranged along a second direction different from the first direction and provided on the other side of the ion conductor in contact with the ion conductor whereby to perform the recording of a two dimensional image by selectively applying electrical potential to each strips of the first and second electrode member.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art form this detailed description.

BRIEF DESCRIPTION OF THE DRAWINGS

FIG. 6 is a structural view of a first embodiment of the optical device according to the present invention;

FIG. 7A and 7B are structural views of a second embodiment of the optical device according to the present invention respectively;

FIG. 8 is a structural view of a third embodiment of the optical device according to the present invention;

DESCRIPTION OF THE PREFERRED EMBODIMENT

Figure 1:
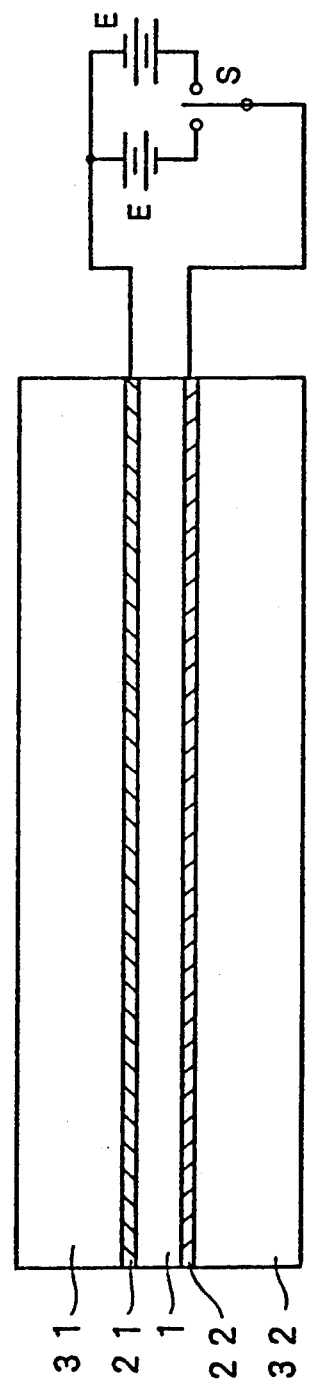
FIG. 1 is a view of the basic structure of the optical device according to this invention.

An embodiment according to this invention will be explained with reference to the drawings attached hereto. FIG. 1 is a sectional view of the optical device according to the embodiment of this invention for the explanation of its basic structure. An optical member (ion conductor) 1 in the form of a film is formed of a high molecular material, such as, for example, vinyl resin containing mobil ions. A pair of electrodes 21, 22 are formed as films respectively on the top side and the underside of the ion conductor 1. The electrodes 21, 22 are sandwiched by a pair of glass sheets 31, 32. The ion conductor 1, the electrodes 21, 22, and the glass sheets 31, 32 constitute a single optical device. A switch S is operated to apply a potential difference E having an inverted polarity to the electrodes 21, 22.

In the above-described optical device, when a potential difference E with a set polarity is applied between the electrodes 21, 22, ions contained in the ion conductor 1 transfer in the macromolecular material, and an equivalent polarization occurs. A refractive index of the ion conductor 1 rises in one of its interfaces with the electrodes 21, 22 and drops in the other interface. Consequently an optical reflective rate, optical transmittance and total reflection conditions in these interfaces can be changed, and resultantly optical modulation can be performed. Since the refractive index can be reversibly controlled by an applied electric field, resultantly reversible optical modulation can be realized.

Next the processes for fabricating the above-described optical device will be explained. A first fabrication process is polymerization in a photo-cell. Specifically, 2.0 g of ethyl methacrylate, 2.8 mmol of tetrabutylammonium bromide, 5.6 mmol of tributylstannane bromide, and 5 mg of 2,2'-azobisisobutyronitrile as a polymerization initiator are loaded in a photo-cell with vaporized ITO (indium tinoxide) transparent counter electrodes to react at 65° C. for 10 hours, and then were slowly cooled to the room temperature. And the above-described optical device is prepared.

A second fabrication method is cast method. Specifically, 2.0 g of poly(vinyl chloride), 2.8 mmol of tetrabutylammonium iodide, the (4:1) mixed solution of tetrahydrofuran methonol containing 5.6 mmol of tetrabutylstannane iodide are applied to coat a glass substrate with vaporized ITO transparent electrodes by a spinner. Then another glass substrate with a vaporized ITO transparent electrode is lightly pressed on the coating film so as to sandwich the coating film with the ITO transparent electrode, and an optical device is prepared.

The composition of the ion conductor may be various combinations. As polymers, for example, poly(methyl methacrylate), poly(butyl methacrylate) and poly(acrylonitrile) may be used. As quaternary ammonium salt, tetrabutylammonium chloride, tetrabutylphosphonium bromide may be used. It is sufficient that an organometallic complex which plays an important role in the ion conduction has a Lewis acidity. For example, diiododioctylstannane, diiododibutylstannane, triiodobutylstannane, tetrabutylstannane, iodotrioctylstannane, diiododimethylstannane, diododiphenylstannane, bis(organotin) compound tributyl borate, tripropyl borate, triethyl borate and octydimethyl fluorosilane may be used. But for high ion conduction, and response property of rapid refractive index change, tributylstannane bromide and tributylstannane iodide, which have medium Lewis acidities, are suitable. Macromolecular ion compounds, e.g., poly{methacrylate(2-bromotrimethylammonium)ethyl} may be used.

Next, a measurement example of the refractive index changes will be explained. In this example, reflectivity index changes of the optical device accompanying refractive index changes were detected to be as shown in FIG. 2, by detecting the reflected beam on the interface between the ITO transparent electrodes and the ion conductor by a silicon photo-diode and using helium-neone laser (632.8 nm) as the beam source.

Figure 2:
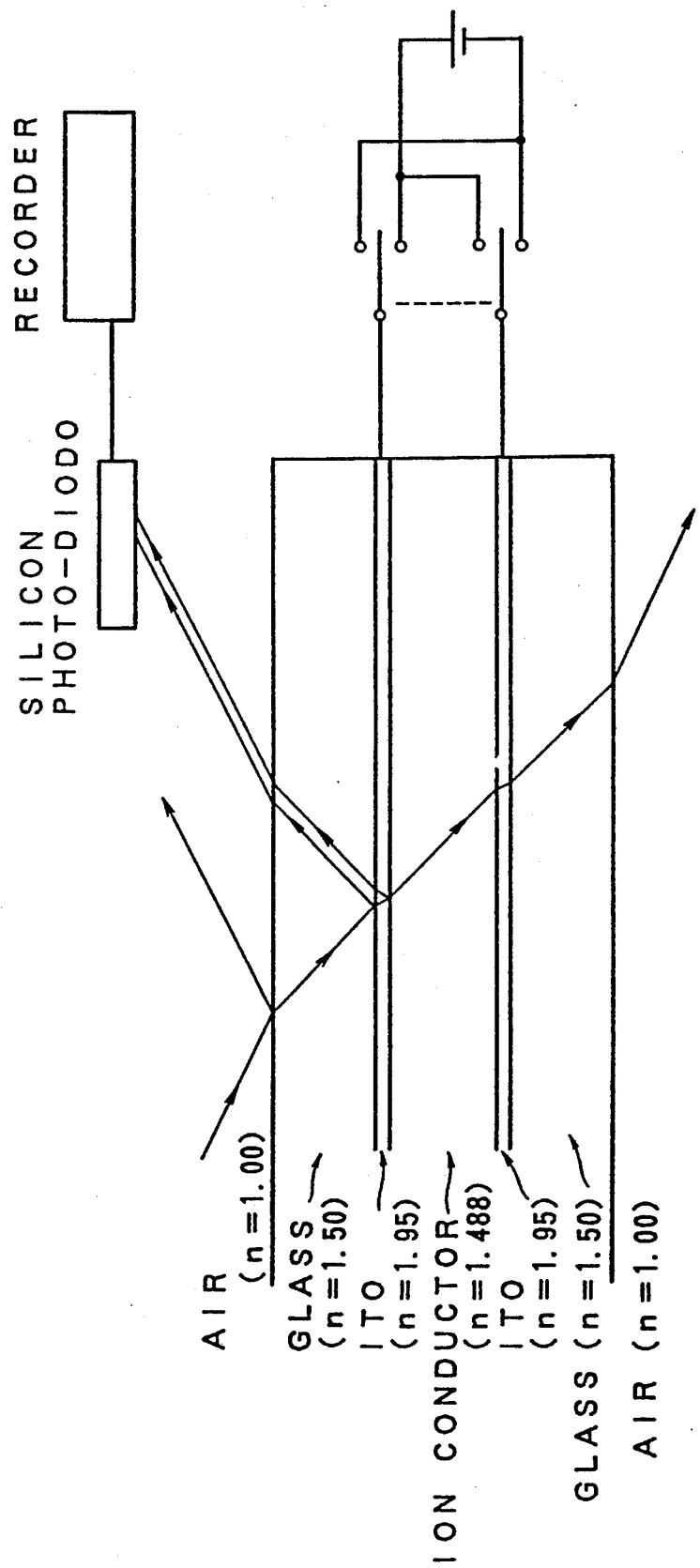
FIG. 2 is a view of an experimental device for measuring the variety of reflection rate of an optical device according to the present invention.

In the above-embodiment shown in FIG. 2, the modulation of the incident beam is observed on the basis of the reflection from an interface between the ion conductor and the upper located ITO electrode C located at the incident side). But, the optical modulation of the incident beam can be also realized by observing the reflection from an interface between the lower located ITO electrode and the ion conductor.

Figure 3:
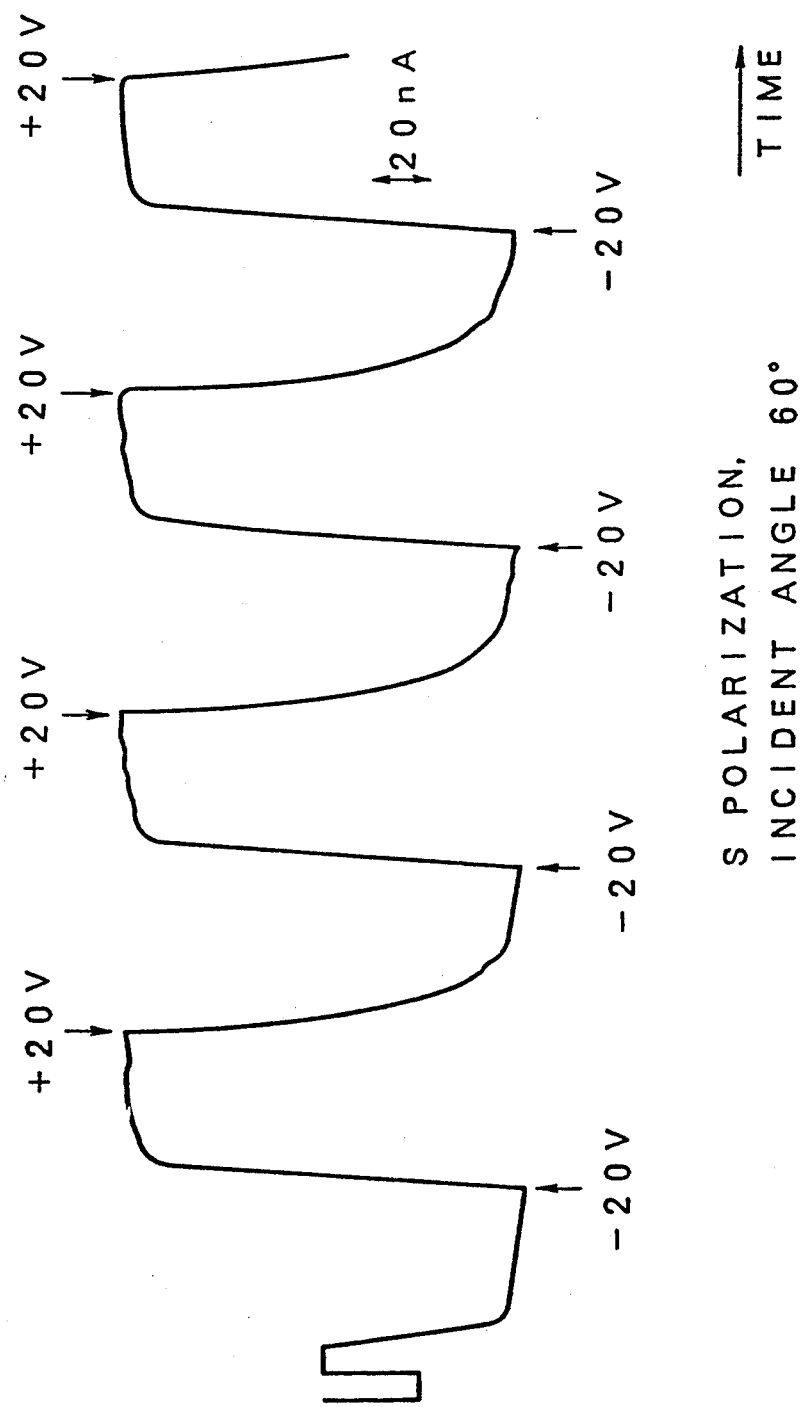
FIG. 3 is an explanatory view of the experiment result obtained by using the experimental device shown in FIG. 2.
Figure 4:
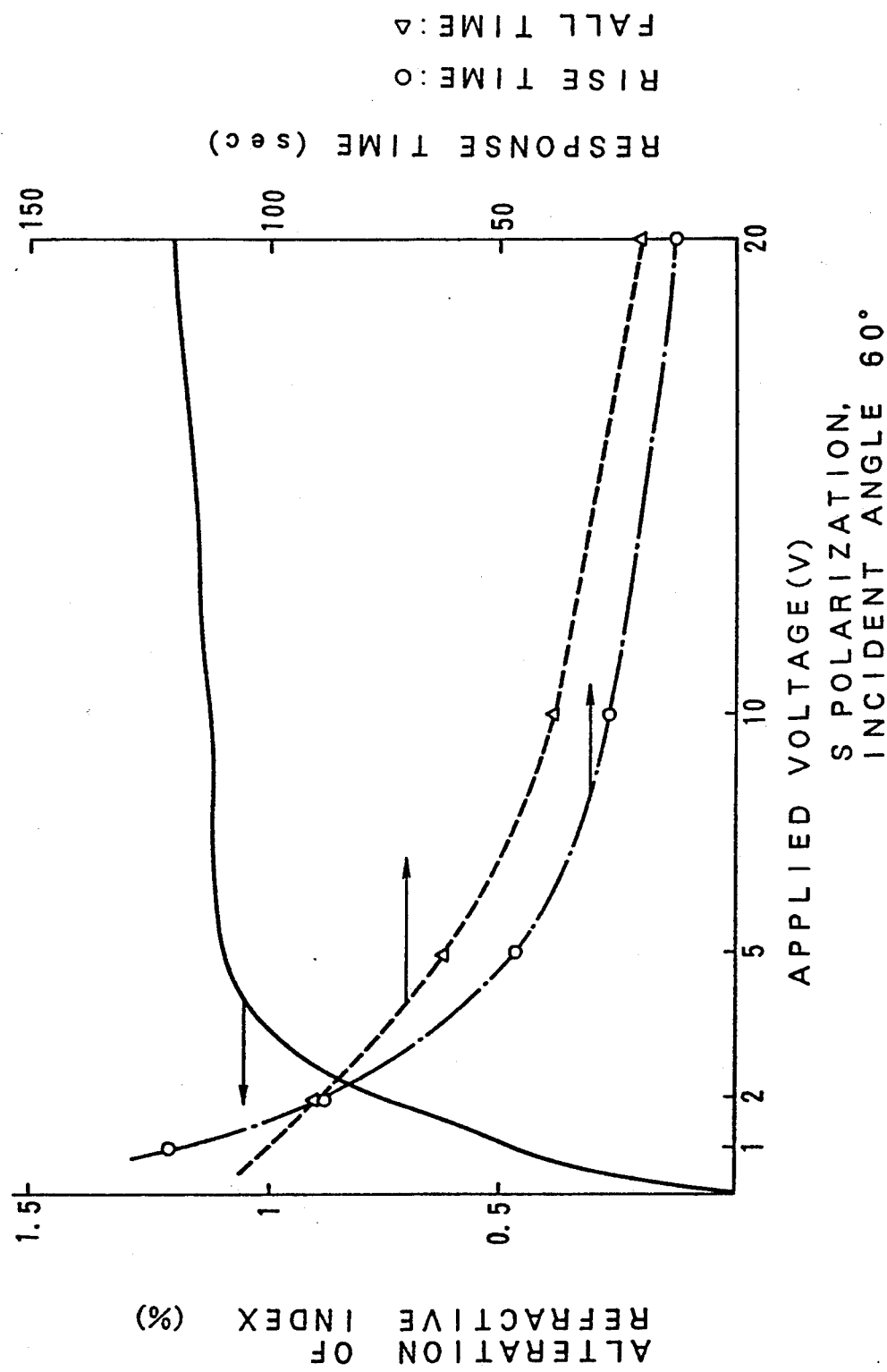
FIG. 4 is an explanatory view of the another experiment result obtained by using the experimental device shown in FIG. 2.
Figure 5:
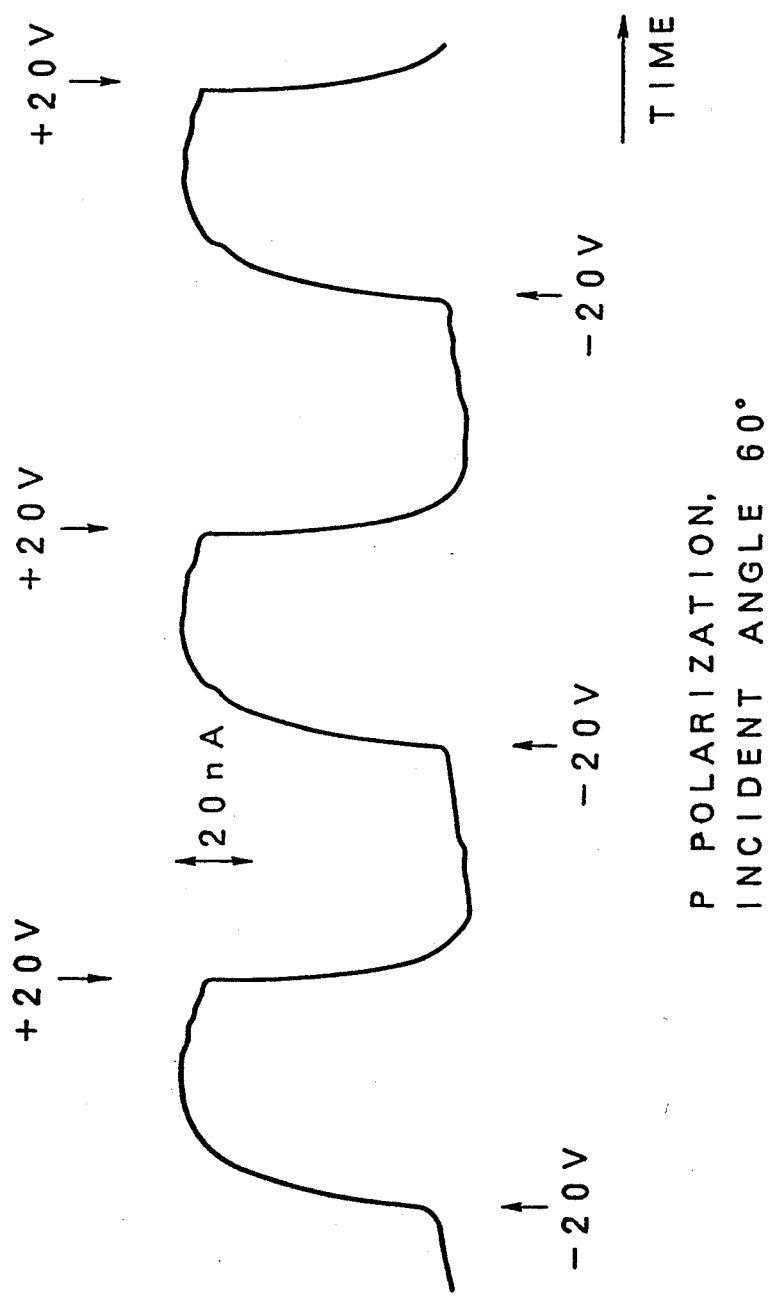
FIG. 5 is an explanatory view of further another experiment result obtained by using the experimental device shown in FIG. 2.

FIG. 3 shows the measurement result of the reflected beam of S-polarized beam at 60° incidence at ±20 V. FIG. 4 shows the measurement result of applied voltage dependence of the refractive index change and the response time. The same refractive index change (reversible change) can be realized on cation conductors. Specifically, 56 mg lithium perchlorate, 0.6 g of toluene diisocyanate, and 1 g of PPO (polypropyleneoxide) were used as the initiating materials, and a cation conductor was prepared. FIG. 5 shows the measurement result obtained by the reflectivity measuring method in FIG. 2. Next, various structures of the optical device according to this embodiment will be specifically explained with reference to the drawings attached hereto.

FIG. 6 is a sectional view of one example of the embodiment. In FIG. 6, the ion conductor 1 is made of a material whose refractive index n is $1.47 \sim 1.50$. The electrode 21, 22 are formed of ITO whose refractive index is $n=1.95$. The glass sheets 31, 32 are formed of a glass material whose refractive index is $n=1.5$. An incident beam $A_0$ is emitted from a He-Ne laser having a 632.8 nm wavelength as the beam source 4 to be incident on the glass sheet 31 at a 82° incident angle. The incident beam takes three optical paths. A first optical path is Optical path $A_1$ (indicated by the dot-line in FIG. 6) in which the incident beam reflects on the interface between the electrode 21 and glass sheet 31. A second optical path is Optical path $A_2$ in which the incident beam reflects on the interface between the electrode 21 and the ion conductor 1. A third optical path is Optical path $A_3$ in which the incident beam passes the ion conductor 1. The beam along Optical path $A_1$ is cut off by an aperture 5. The beams along Optical paths $A_2$, $A_3$ are detected respectively by a photo-detectors 6, 7. Actually, however, it is rather difficult to cut off the beam by the aperture. In such case, both the beams along Optical paths $A_1$, $A_2$ may be detected by the photo-detector 6 and electrically separated. This separation makes it possible to remove the beam below a threshold level by providing a comparator.

In this state, a 20 V-potential difference is applied between the electrodes 21, 22, a refractive index of the ion conductor changes from $n=1.488$ to 1.473, and an incident beam $A_0$ on the interface between the ion conductor 1 and the electrode 21 exceeds a critical angle. Consequently the beam along the Optical path $A_3$ is not detected by the photo-detector 7. Resultantly the above-described structure enables the ON-OFF of the transmitted beam.

FIG. 7A and 7B show an optical device according to the embodiment having the beam modulation effect improved by multiple reflection. As shown in FIG. 7A, a pair of ion conductors 1A, 1B having on both sides electrodes 21A, 22A and electrodes 21B, 22B which are formed of the same materials are adhered respectively to both sides of a glass sheet 10 of a high refractive index. A beam from the beam source 4 is incident on one side of the glass sheet 10, and the outgoing beam is detected on the other side by a photo-detector 6. In connection with a potential difference applied between the electrodes 21A, 21B and between the electrodes 22A, 22B, the electrode 21A and the electrode 21B have the same polarity, and the electrode 22A and the electrode 22b have the same polarity, so that the optical modulation occurring at Point a on the interface between the ion conductor 1A and the electrode 21A is augmented by the optical modulation occurring at Point b on the interface between the ion conductor 1B and the electrode 21B. Consequently the optical modulation can be improved by the multi-reflection. If the electrodes 21A, 21B of the same material have opposite electrodes to each other, the optical modulation at Point a and that at Point b work inversely without producing any optical modulation effect. Thus, the electrodes 21A, 22A, and the electrodes 22A, 22B respectively have the same polarity. The optical device of the structure of FIG. 7B does the same function as that of FIG. 7A. Only one difference is that there are disposed blocks 11, 12 of optical glass respectively at the beam incidence position and the beam outgoing position. In the case the electrode 21A and the electrode 21B are formed of optically different materials, the electrodes 21A, 21B may have the same polarity to improve the optical modulation.

FIG. 8 shows an multi-reflection type of the optical device according to the embodiment which uses electrodes 21, 22 of different materials. The electrodes 21, 22 are adhered respectively to both sides of an ion conductor 1. When a voltage is applied to the ion conductor 1, one of the interfaces between the ion conductor 1, and the electrode 21 or the electrode 22 has higher refractive index, the other of the interfaces having a lower refractive index. Since the electrodes 21, 22 are formed of different materials, their refractive indexes are different from each other, which augments the optical modulation. Since what is required with the electrodes 21, 22 is that they have high refractive indexes, it is preferable that the electrodes 21, 22 are opaque (e.g., Al and As electrodes).

Figure 9:
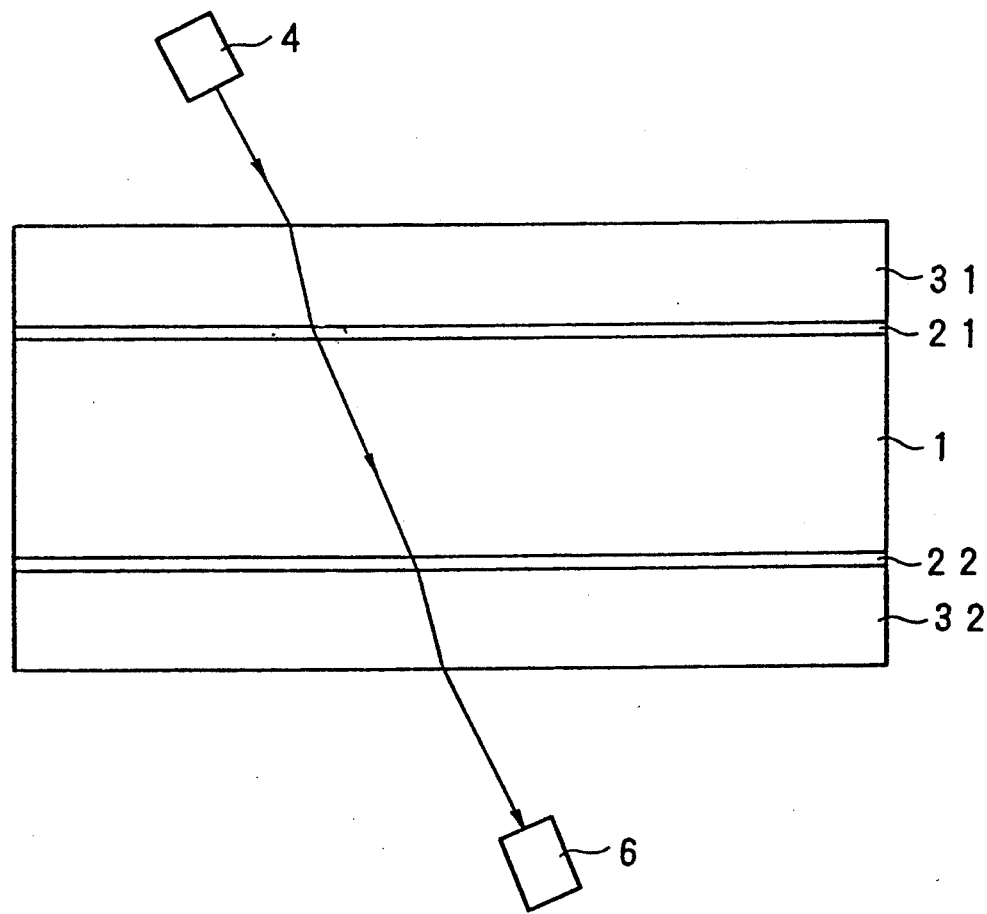
FIG. 9 is a structural view of a fourth embodiment of the optical device according of the present invention.

FIG. 9 is a sectional view of an optical modulating optical device of beam transmitting type according to the embodiment. As shown in FIG. 9, an electrode 21 of, e.g., ITO, and an electrode 22 of, e.g., Au, are disposed on both sides of an ion conductor 1. They are sandwiches by glass sheets 31, 32.

When a potential difference is applied between the electrodes 21, 22, the ion conductor 1 has a higher refractive index on one of the interfaces, and a lower refractive index on the other of the interfaces. These electrodes 21, 22 have optically different qualities from each other. Consequently reversible optical modulation using refractive index changes can be performed, and the optical modulation can be detected by a photodetector 6.

Figure 10:
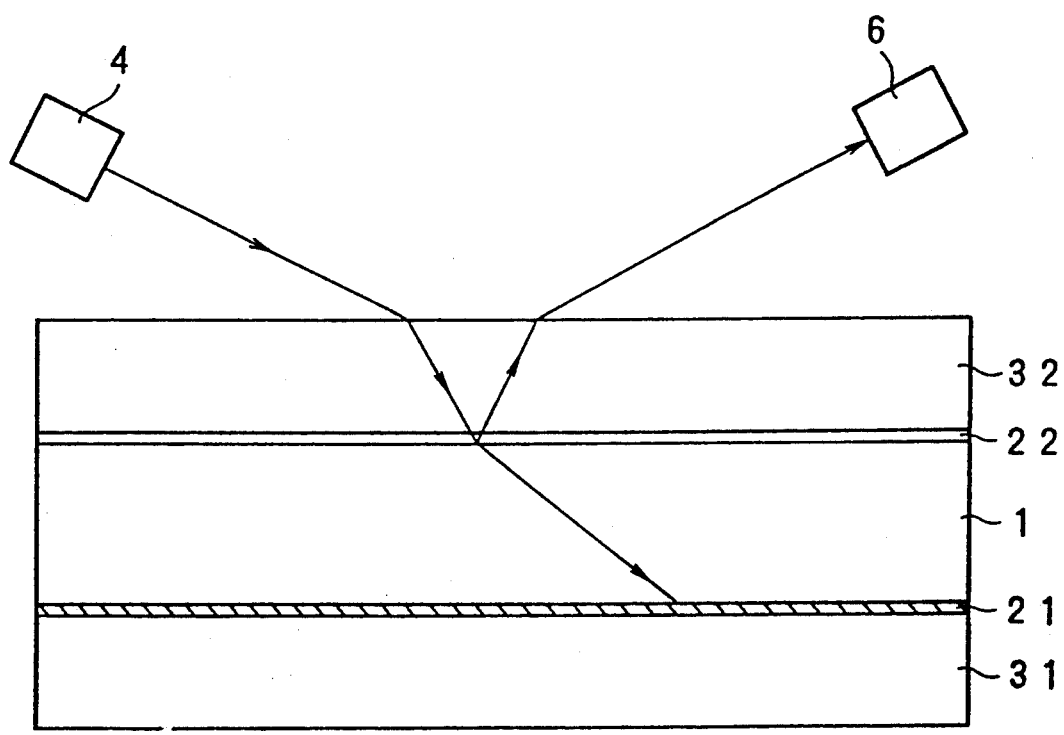
FIG. 10 is a structural view of a fifth embodiment of the optical device according to the present invention.

FIG. 10 shows an optical modulating optical device of beam reflecting type according to the embodiment. A characteristic of this optical device is that an electrode 22 is a transparent electrode of, e.g., ITO, but an electrode 21 is formed of a light absorbing opaque material (e.g., carbon black). Accordingly most of an incident beam is absorbed by the electrode 21, and only reflected part of the incident beam on the interface between the ion conductor 1 and the electrode 22 enters a photo-detector 6. This example is preferably especially to the case that the ion conductor 1 is a thin film. This arrangement prohibits the mixing of the reflected beam on the interface between the electrode 22 and the ion conductor 1 and that on the interface between the electrode 21 and the ion conductor 1.

Figure 11A:
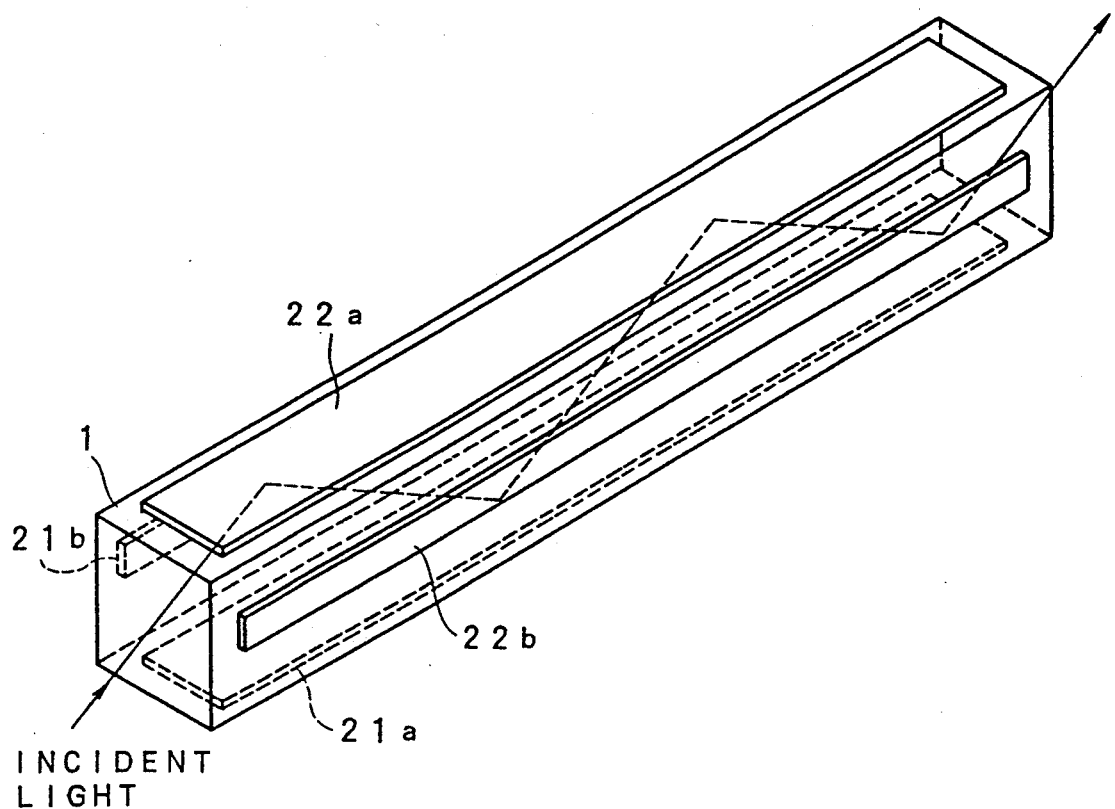
FIG. 11A and 11B are structural views of a sixth embodiment of the optical device according to the present invention respectively.
Figure 11B:
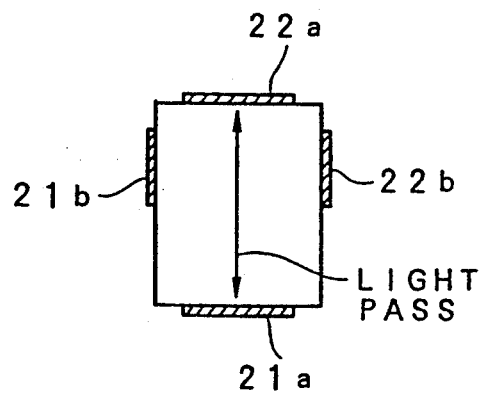

FIG. 11A and 11B are optical devices according to the embodiment having pairs of electrodes so disposed that one pair of electrodes crosses the other pair. FIG. 11A is a perspective view, and FIG. 11B is a cross-sectional view. As shown, a pair of electrodes 21a, 22a are disposed on the top side and the underside of an ion conductor 1, and another pair of electrodes 21b, 22b are disposed on the right and the left sides of the ion conductor 1. Since the electrodes 21b, 22b are nearer to the upper electrode 22a, the field intensity of the interface between the electrode 21a and the ion conductor 1, and that of the interface between the electrode 22a and the ion conductor 1 are unequal. Consequently, the ion conductor 1 have refractive indexes different from each other at the respective interfaces. A beam is multi-reflected on these interfaces, whereby the optical modulation can be conducted.

Preferred embodiments using macromolecular materials have been described above. However, it is possible to use other materials.

Figure 12:
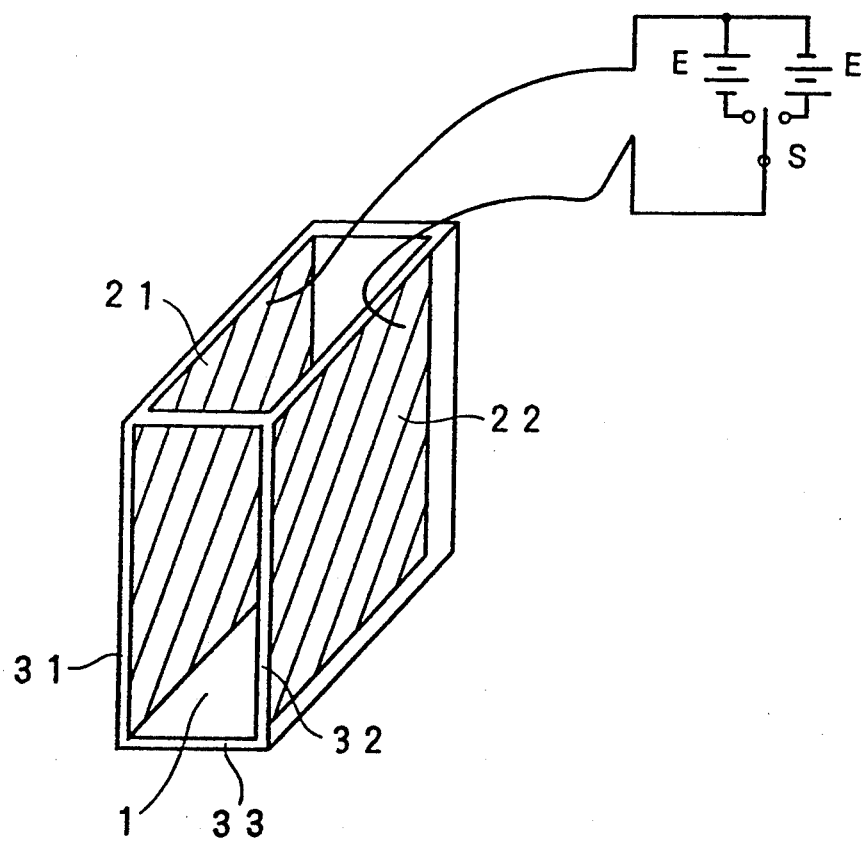
FIG. 12 is a view of another basic structure of the optical device according to this invention.

FIG. 12 is a view of a basic structure of the optical device using liquid whose viscosity is lower than the macro molecular materials. The liquid can be an organic solution comprising halogenide anions. As shown in FIG. 12, the light transmitting container is made of glass sheets 31 and 32, and electrodes 21, 22 are formed in films on inside faces of the cell having a glass sheet 33 as the bottom. This container holds dimethylformamide solution with 1 mmol of tetrabutylammonium bromide solved, and thus a single optical device is constituted. A potential difference E having polarities inverted is applied between the electrodes 21, 22 by switch operation.

Figure 13:
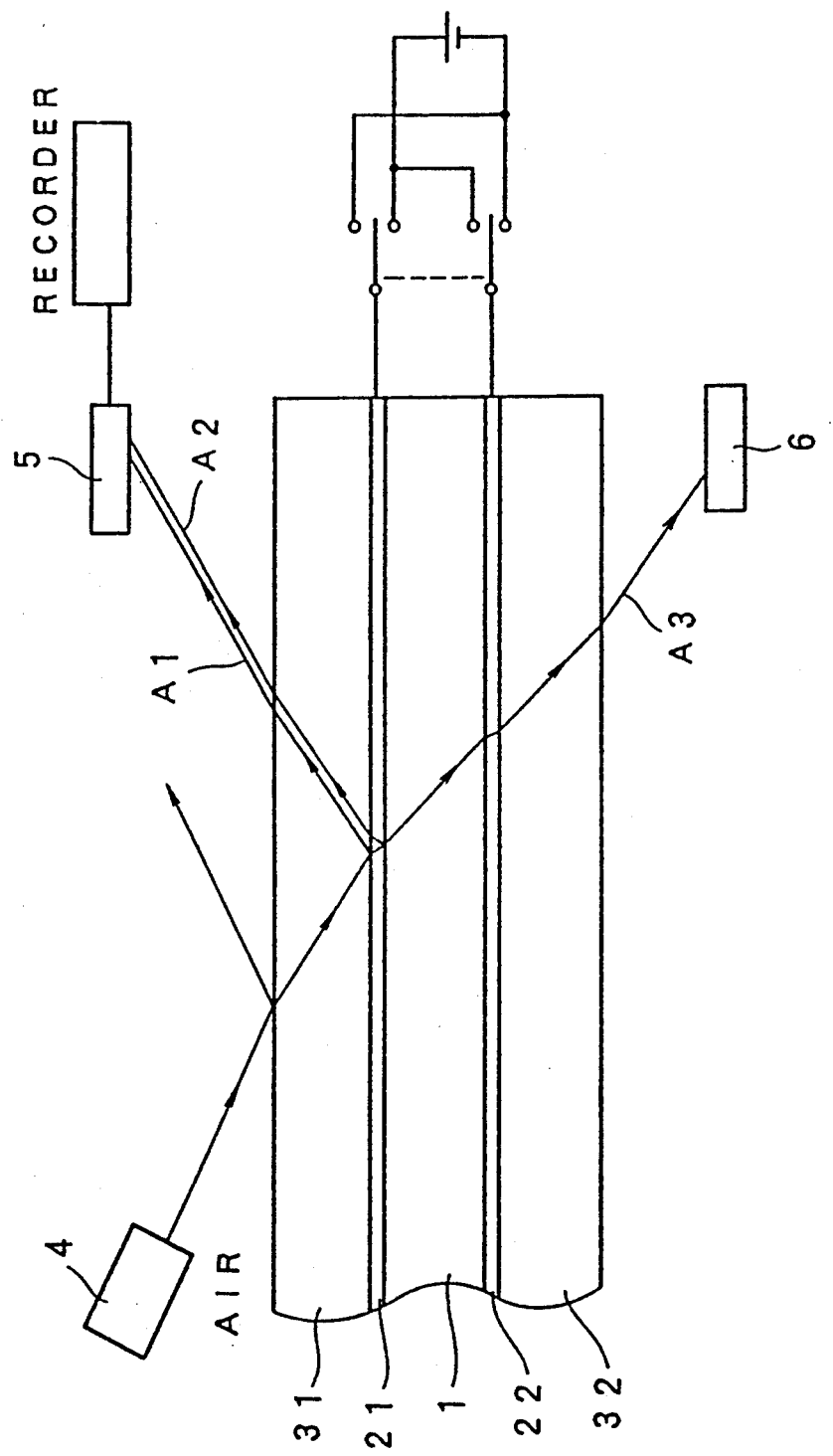
FIG. 13 is an explanatory view of a specific experiment made by the inventors, using an optical device according to the present invention.
Figure 14:
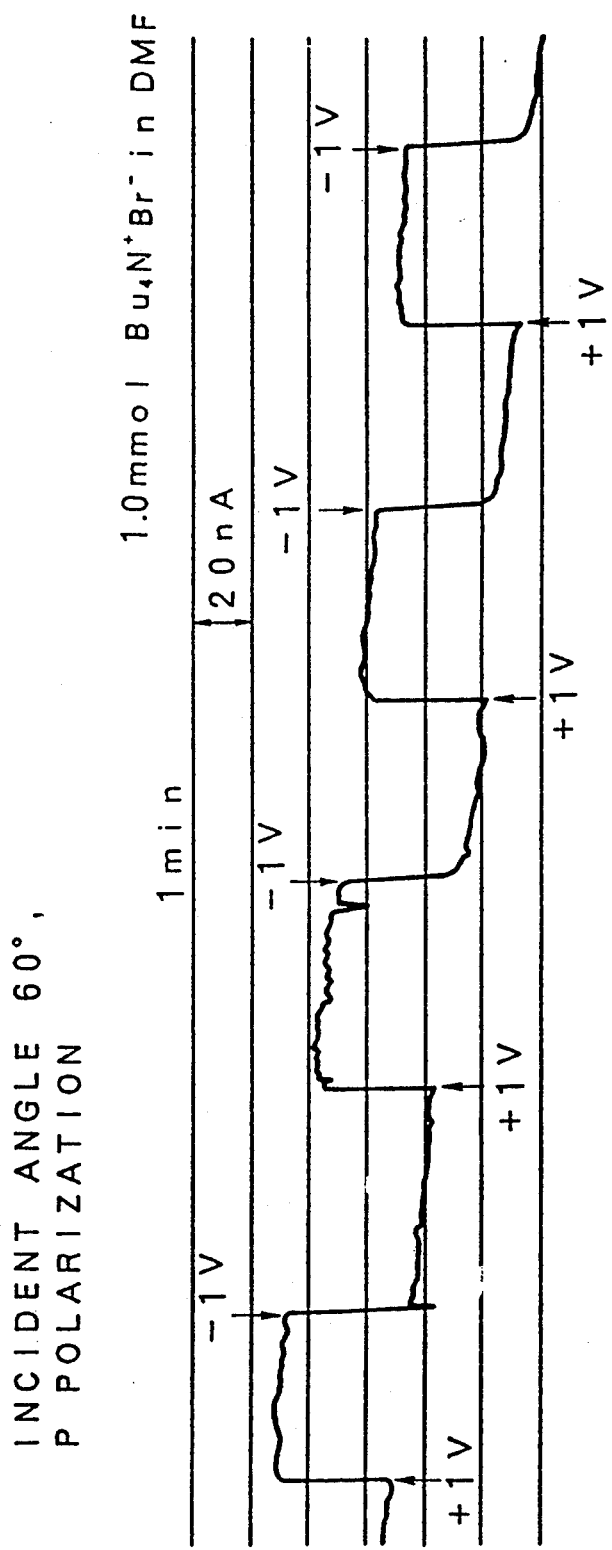
FIG. 14 is an explanatory view of the experiment result in the optical device according to the present invention.

In this optical device, the same as the optical device using macromolecular materials when a set potential difference E is applied between the electrodes 21, 22, ions contained in the ion conductor 1 made of liquid transits, and an equivalent polarization occurs. Then a refractive index of the ion conductor 1 at one of its interfaces with the electrodes 21 or 22 goes up, that on the other interface going down. Consequently the beam reflectivity or transmittance at the interfaces, or total reflection conditions there can be changed, and resultantly optical modulation can be conducted. The refractive index can be reversibly controlled by application of an electric field. Consequently reversible optical modulation can be realized. Next, with reference to FIG. 13, an example of the measurement of changes of the refractive index by the above-described optical device will be explained. An incident beam is emitted from a beam source 4, He-Ne laser of a 632.8 nm wavelength. The beam is P-polarized to be incident on the glass sheet 31 at an incident angle of 60°. The incident beam takes three optical paths. A first optical path is Optical path A3 in which the incident beam is reflected on the interface between the transparent electrode 21 of ITO (indiumtinoxide) and the glass sheet 31. A second optical path is Optical path A2 in which the incident beam is reflected on the interface between the transparent electrode 21 and the ion conductor 1. A third optical path is Optical path A3 in which the incident beam passes the ion conductor 1. The incident beams along Optical paths A1 and A2 are detected by a silicon photo-diode 5, and the incident beam along Optical path A3 is detected by a silicon photo-diode 6. FIG. 14 shows the measurement result of the reflected beams in the case that ±1 V is applied between the transparent electrodes 21, 22. Between the cases that +1 V potential difference is applied and that −1 V potential difference is applied, the refractive index of the ion conductor 1 reversibly changes between 1.44293 and 1.44987, and the reflectivity of the reflected beams have changed. This measurement result shows that ion conduction takes place by applying a potential difference to the ion conductor 1, and the refractive index is reversibly changed, whereby the reflected beams can be modulated.

As the solvent used for the ion conductivity 1, in addition to dimethylformamide, any solvent that is not easily electrolyzed can be used. Such solvent is exemplified by dimethyl sulfoxide, propylene carbonate, ethylene carbonate and acetonitrile.

In this invention, as the composition of the ion conductor 1, various combinations are possible in addition to the above. As a compound which generates cations in the solvent, in addition to tetrabutylammonium, for example, tetraphenylammonium, tetrabutylphosphonium, tetraphenylphosphonium; their tributyl derivatives, triphenyl derivatives, diphenyl derivatives, monobutyl derivatives, monophenyl derivatives; lithium cation may be used. As a compound which generates anions in the solvent, in addition to bromide anions, chloride anions, fluoride anions, iodide anions, hexafluorophosphate, tetrafluoroborate, etc. may be used.

Figure 15:
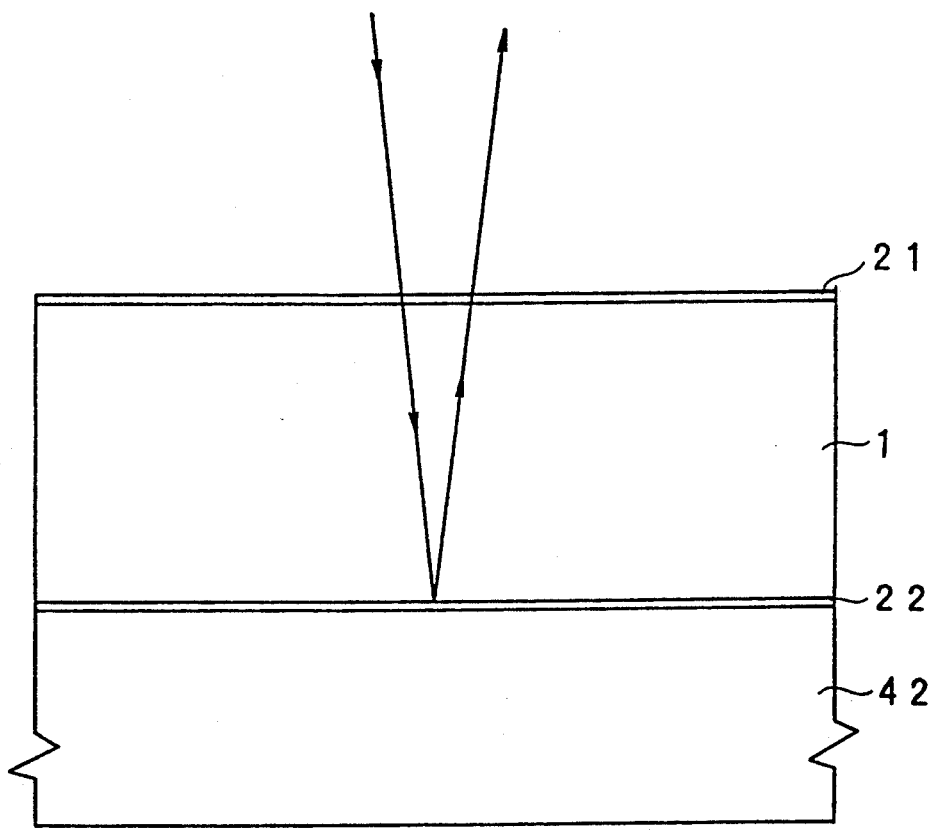
FIG. 15 is a view of a example of the application of the optical device according to the present as a anti-reflection film or reflection increasing film.

FIG. 15 shows an application of the optical device according to the embodiment to a variable wavelength anti-reflection film or reflectivity increasing film. As shown in FIG. 15, electrodes 21, 22 are adhered to both sides of an ion conductor 1. The thus-prepared optical device is disposed on a substrate 42 requiring antireflection or reflection increase. When a potential difference E is applied between the electrodes 21, 22, a refractive index of the ion conductor 1 at the interface of the ion conductor with the electrode 22 can be changed. Consequently a wavelength range can be easily controlled for higher and lower refractive indexes.

Figure 16:
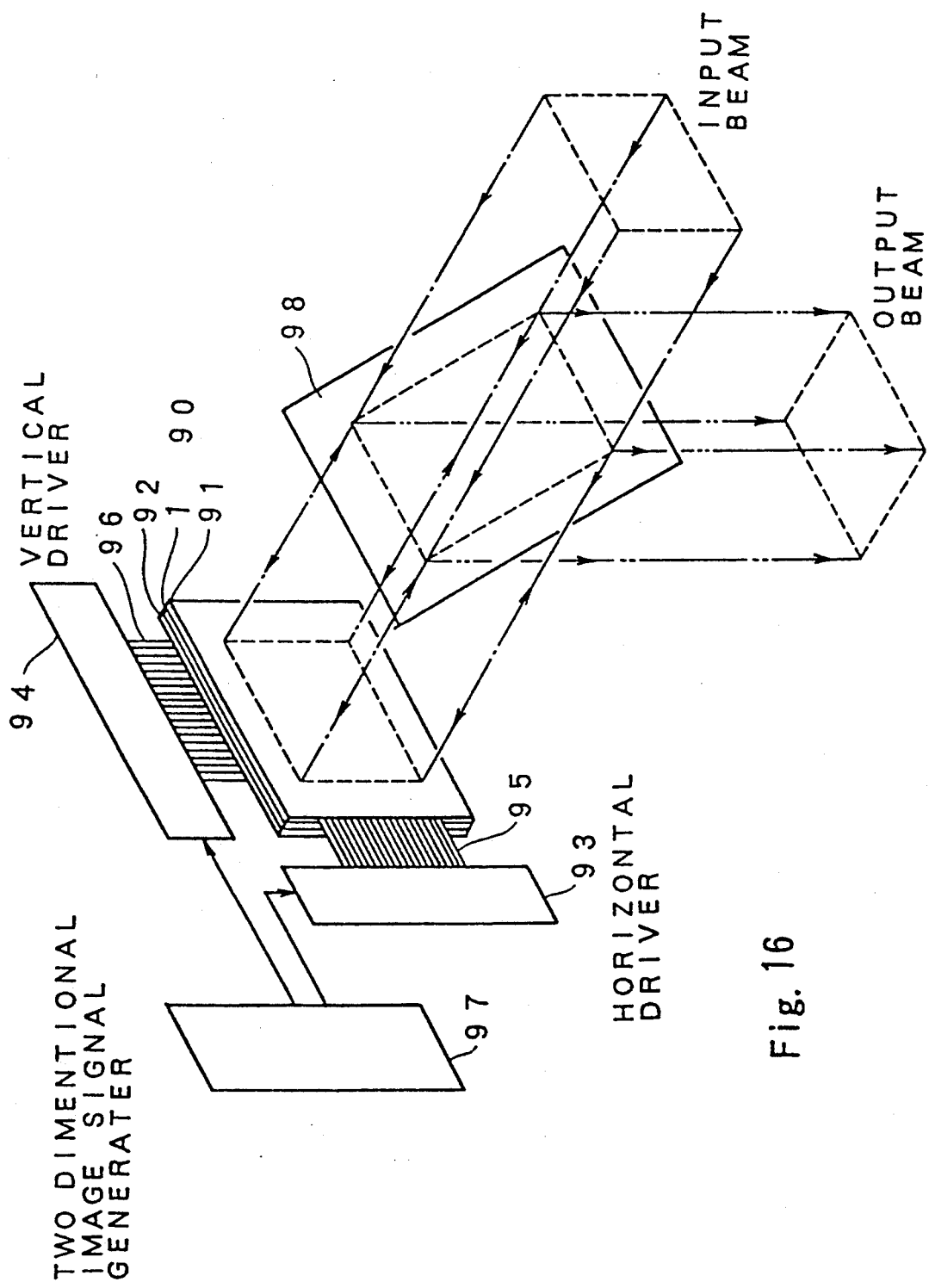
FIG. 16 is an explanatory view of an information recording apparatus using the optical device according to this invention.
Figure 17:
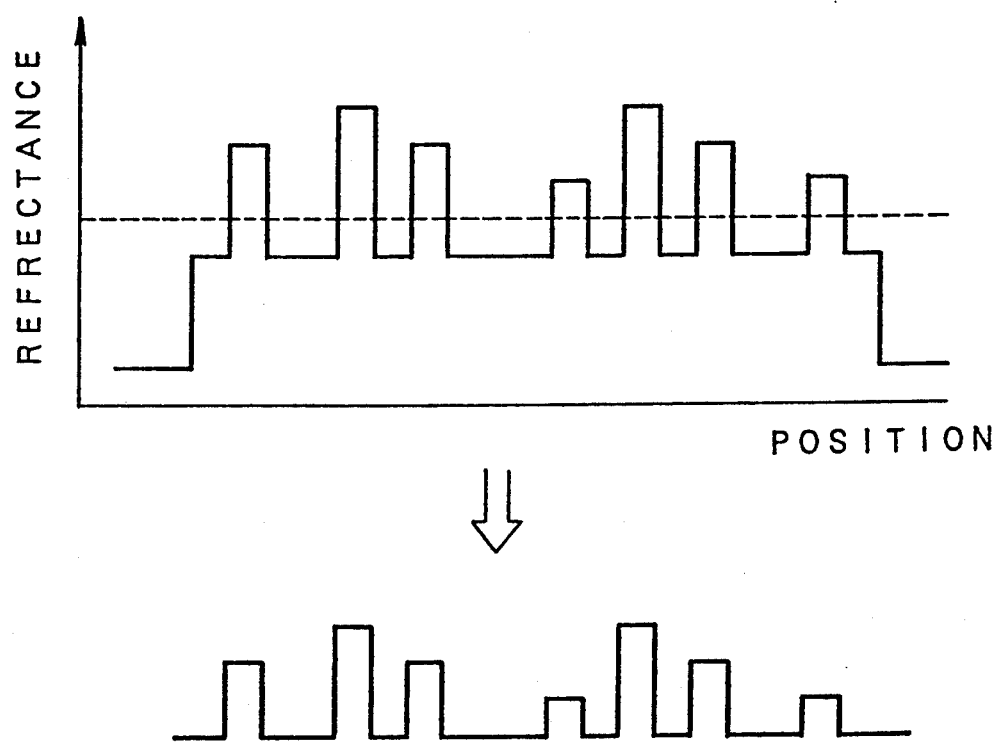
FIG. 17 is an explanatory view of a read operation of the information recording apparatus shown in FIG. 16.

FIGS. 16 and 17 show concepts of information writing and reading using the optical device according to the embodiment. As shown in FIG. 16, a two-dimensional image recording panel 90 which is the optical device includes a plate-type ion conductor 1. A horizontal electrode plate 91 and a vertical electrode plate 92 are adhered to both sides of the ion conductor 1. The horizontal electrode 91 includes a number of horizontal electrodes (not shown) horizontally arranged parallel with one another. The vertical electrode plate 92 includes a number of vertical electrodes (not shown) vertically arranged parallel with one another. The respective horizontal electrodes are connected to respective output terminals of a horizontal driver 93 by lines 95, and the respective vertical electrodes are connected to respective output terminals of a vertical driver 94 by lines 96. The horizontal driver 93 and the vertical driver 94 are supplied with a horizontal and a vertical drive signals from a two-dimensional image signal generator 97.

In this two-dimensional image recording panel 90, when a voltage is applied, a potential difference takes place in the ion conductor 1 at an intersection between the horizontal electrode and the vertical electrode, and a refractive index changes. Consequently an output from a two-dimensional image signal generator 97 is recorded as a distribution of refractive index corresponding to a two-dimensional image. And the refractive index on the panel 90 corresponds to the reflectivities on the source. Accordingly the two-dimensional image can be read by detecting reflected rays of incident parallel beam. That is shown in FIG. 16, when parallel beam are incident on the two-dimensional recording panel 90 via a half mirror 98, because a reflectivity at the interface with the ion conductor 1 included in the two dimensional image panel 90, varies in accordance with a distribution of a refractive index, the outgoing beam detected via the half mirror 98 have a two-dimensional intensity distribution. Consequently an image on the two-dimensional image recording panel 90 can be read as a distribution of reflectivities as shown in FIG. 17. It is preferable for the prevention of mixing of the reflected rays that the respective vertical electrodes of the vertical electrode plate 92 are made of a light absorbing material, and the respective horizontal electrodes of the horizontal electrode plate 91 are made of a light transmitting material.

In the above-described optical device, a liquid including mobil ions is used as the ion conductor. But according to this invention, it is possible that, in place of the liquids, a light-transmitting inorganic solid body formed in a film, e.g., $\beta$-alumina containing sodium ions or $Rb_4Cu_{16}I_7Cl_{13}$, is used. In this case, a pair of electrodes formed in sheets are disposed on both sides of the inorganic solid body, and the inorganic solid body is sandwiched by a pair of glass sheets. The thus-prepared optical device can produce the same advantageous effect as the above-described embodiment.

Further the present invention can be also applied to the operation between images.

As described above in good detail, according to this invention, a refractive index is reversibly varied by ion conduction, whereby transmitted beams or reflected beams of the optical device can be reversibly varied. Consequently the optical device according to this invention can reversibly control a refractive index, and can operate at low voltages.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

We claim:

1. An optical device comprising:
    an ion conductor consisting essentially of one of:
        a solid consisting essentially of at least one of the following:
            polybutylmethacrylate;
            polyacrylonitrile;
            tetrabutylammonium chloride;
            tetrabutylphosphorium bromide;
            tributylstannane bromide;
            tributylstannane iodide; and
            polymethacrylate (2-bromotrimethylammonium) ethyl; and
        a solution consisting essentially of the following:
            a solvent consisting essentially of at least one of the following:
                dimethyl formanide;
                dimethyl sulfoxide;
                propylene carbonate;
                ethylene carbonate; and
                acetonitrile; and
            a compound in said solvent consisting essentially of at least one of the following:
                tetrabutylammonium bromide;
                tetraphenylammonium;
                tetrabutylphosphonium;
                tetraphenylphosphonium; and
                tributyl, triphenyl, diphenyl, monobutyl and monophenyl derivatives thereof,
    said ion conductor comprising mobile ions and having a refractive index reversibly varying according to an electric field applied thereto; and
    at least one pair of electrodes facing each other through said ion conductor and directly contacting said ion conductor;
    wherein when said electric field is applied to said ion conductor through said electrodes, the refractive index in at least one area of said ion conductor changes according to said applied electric field.

2. An optical device according to claim 1, wherein at least one portion of said electrodes is made of a transparent conductive material.

3. An optical device according to claim 1, wherein said ion conductor is formed in a thin film.

4. An optical device according to claim 3, further comprising a pair of glass sheets, disposed at the both sides of said electrodes and sandwiching said optical device.

5. An optical device according to claim 1, further comprising a second pair of electrodes facing each other and contacting said ion conductor.

6. An optical device according to claim 1, wherein:
    said ion conductor essentially consists of said solution, and said device further comprises:
    a container accommodating said ion conductor, at least one portion of said container comprising a transparent material,
    said electrodes being located on inside surfaces of said container.

7. An optical device according to claim 6, wherein said container comprises a pair of parallel glass plates facing each other.

8. An optical device according to claim 1, wherein:
    said ion conductor consists essentially of said solid;
    one of said electrodes comprises:
        a plurality of strips in parallel arranged along a first direction and disposed on one side of said ion conductor in contact with said ion conductor; and
    another of said electrodes comprises a plurality of strips in parallel arranged along a second direction different from the first direction and disposed on another side of said ion conductor in contact with said ion conductor to cause recording of a two dimensional image by selectively applying electrical potential to each strips of said electrodes.

9. An optical switch comprising:

a transparent substrate having a first refractive index;

ion conductor films made of a transparent material containing mobile ions and provided on both sides of said transparent substrate, said ion conductor film having a second refractive index lower than said first refractive index;

a pair of electrodes provided on both sides of each of said ion conductor films, one of said pair electrodes contacting with said transparent substrate; and potential applying means for applying electrical potential to the electrodes respectively, whereby to reversible change the refractive index of the ion conductor film to cause the full reflection in an interface between the ion conductor film and the transparent substrate to perform the change of the optical path.

10. An optical device according to claim 9, wherein at least one portion of said electrodes is made of a transparent conductive material.

* * * * *